April 7, 1953      F. R. SHONKA      2,634,374
POCKET RADIATION METER
Filed May 28, 1951
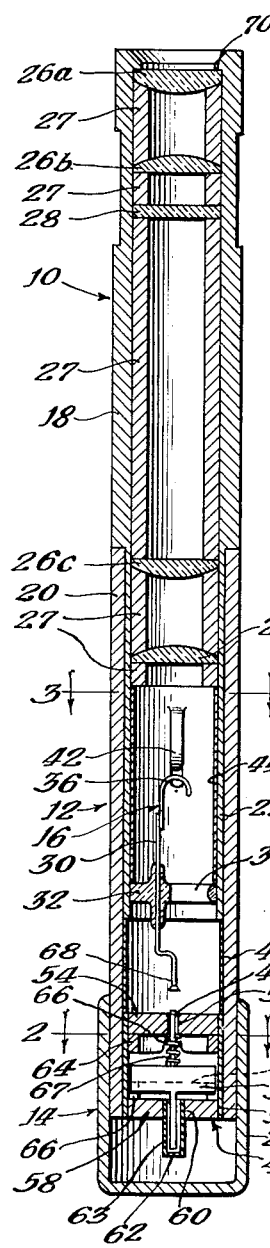
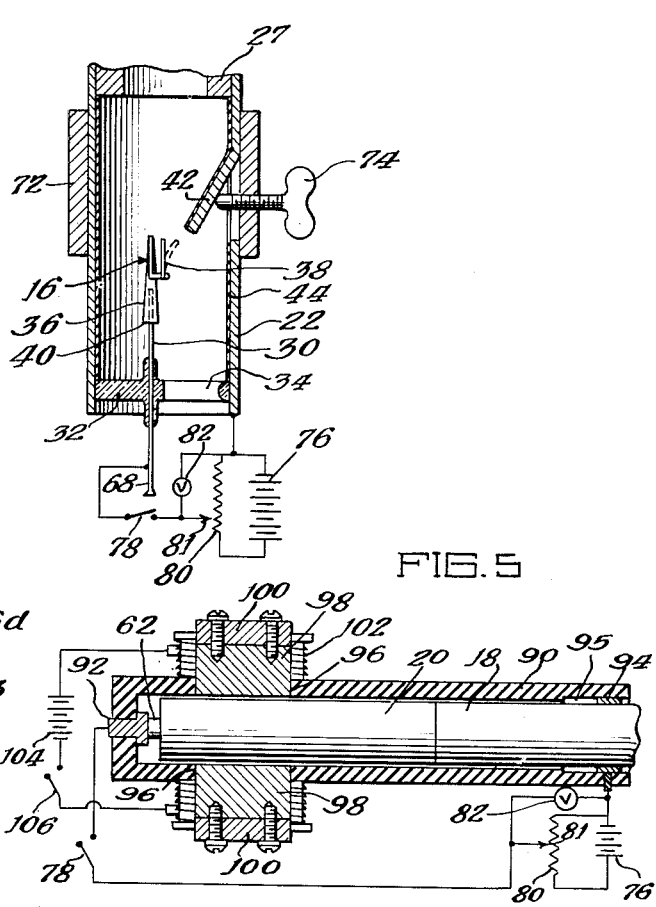
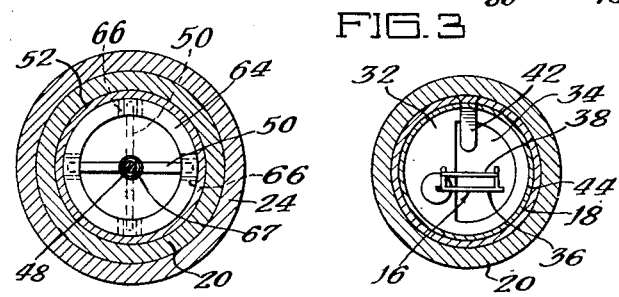
INVENTOR.
Francis R. Shonka
BY Roland A. Anderson
Attorney Patented Apr. 7, 1953

2,634,374

UNITED STATES PATENT OFFICE 2,634,374

POCKET RADIATION METER

Francis R. Shonka, Riverside, Ill., assignor to the United States of America as represented by the United States Atomic Energy Commission Application May 28, 1951, Serial No. 228,718

7 Claims. (Cl. 250—83.3)

This invention relates to a radiation measuring device; and more particularly it relates to an improved electrometer and an improved charging switch which are particularly adaptable for use in radiation measuring devices of the type generally referred to as dosimeters.

The health of personnel employed in handling radioactive materials may be jeopardized if precautions are not taken to see that each individual workman receives only a small enough amount of radiation over a period of time that no permanent damage is done to his body. One of the best ways to ascertain the amount of radiation to which an individual workman has been subjected is to have the workman carry a radiation dosimeter which will give a measurement of the radiation to which it has been subjected while being carried upon the workman, and thus give a measurement of the radiation incident upon the workman. As the number of people engaged in handling radioactive materials has increased, the demand for dosimeters suitable for this purpose has also increased, and one of the objects of the present invention is to provide an electrometer which is suitable for use in a dosimeter and which can be easily calibrated, thus lending itself readily to mass production techniques. To accomplish this result, the present device utilizes an adjustable electrometer which may be used with a preformed scale, rather than requiring a separately constructed and calibrated scale to be used with each individual electrometer.

Previous attempts to mass produce dosimeters have indicated that much custom work in assembling a switch has had to be tolerated. A switch is necessary in a dosimeter, since it functions to isolate at least one of the electrodes within the dosimeter from the terminals on the exterior surface of the instrument, and thus eliminates discharging of the dosimeter as a result of leakage currents flowing between the terminals on the exterior surface of the instrument. It is to be remembered, that these leakage currents are of much greater magnitude than would be expected from the composition of the materials of the exterior surface due to the fact that moisture from the human body collects upon the surface of the dosimeter and greatly reduces the leakage resistance thereof. The switch in a dosimeter must not only perform the usual functions of a switch, but it must also perform these functions without piercing the gas-tight seal between the interior of the dosimeter and the ambient atmosphere. Generally, gases other than air at atmospheric pressure are used in the dosimeter ionization chamber, and these gases will escape or be contaminated if the ambient atmosphere is permitted to seep into the dosimeter. In the past, mass production attempts to manufacture dosimeters have been greatly hampered by the necessity of doing custom work to assure the dosimeter a gas-tight seal which is not broken by actuating the switch. Hence, another object of this invention is to provide a dosimeter switch which may be readily assembled into the dosimeter and which provides a certain gas-tight seal at all times.

Dust within the ionization chamber will also result in a partial discharge of the chamber, and hence during assembly of the dosimeters that have been constructed in the past much effort has been expended to avoid dust. However, no amount of effort in assembly will completely eliminate dust from the chamber, particularly in view of the fact that jarring of the dosimeter when in use causes small particles to be set free from the walls of the ionization chamber. Thus, it is another object of the invention to provide a means for nullifying the effects of dust, so that the efforts to eliminate dust which have been expended in assembling dosimeters in the past may be greatly curtailed.

Other objects and advantages of the present invention will become apparent upon a further reading of the following specification and claims. The invention may be more clearly understood by reading the specification in conjunction with the drawings in which:

Figure 1 is a longitudinal sectional view of a dosimeter embodying the present invention;

Figure 2 is an enlarged transverse sectional view taken along line 2—2 of Figure 1 illustrating in particular the construction of the switch portion of the dosimeter;

Figure 3 is an enlarged transverse sectional view taken along line 3—3 of Figure 1;

Figure 4 is a view of a device for calibrating the electrometer, partly in section and partly schematic; and Figure 5 is a view of the charging device for the dosimeter, also partly in section and partly schematic.

The dosimeter generally consists of an optical system 10, an ionization chamber 12 including an electrometer 16, and a charging switch 14, as shown in Figure 1. The optical system 10 and the ionization chamber 12 are mounted in a cylindrical electrically conducting housing 18, which may be of brass or aluminum, for example. The charging switch 14 is mounted in a supporting tube 20 which has an inner diameter approximately equal to the outer diameter of the cylindrical housing, so that a portion of the housing 18 is snugly fitted within the tube 20 forming a single sealed assembly. The junction between the tube 20 and the housing 18 has been made without a ridge appearing on the outer surface of the assembly by making the outer diameter of the tube 20 equal to the outer diameter of the housing 18, and cutting away the end portion 22 of the housing 18 to a diameter approximately equal to the inner diameter of the tube 20. The end portion 22 of the housing 18 fits snugly into the tube 20 and forms a gas-tight seal in this manner. The charging switch 14 is cylindrical in shape with a diameter approximately equal to the inner diameter of the tube 20, and the charging switch 14 is snugly mounted into the open end of the tube 20 sealing the interior of the assembly from the ambient atmosphere. While the charging switch 14 and the housing 18 may be inserted into the tube 20 snugly enough to form gas-tight seals, it is generally desirable to use a sealing compound between these elements and the tube 20. The tube 20 may readily be fashioned from one of various forms of plastic, in which case there are many good plastic and plastic-to-metal sealing compounds known in the art. A cap 24 is removably mounted about the end of the tube 20 adjacent to the charging switch 14 to protect the switch terminal from mechanical damage. The cap 24 completes the dosimeter.

The optical system 10 focuses upon the electrometer 16, and may be any one of the many well known systems. The optical system 10 shown in Figure 1 consists of two Ramsden eyepieces which are cascaded in order to give sufficient magnification with lenses having less curvature than would otherwise be required. It also results in an erect image, while the single Ramsden eyepiece results in an inverted image, but an inverted image could equally well be used in the present optical system. Four plano-convex lenses 26a, 26b, 26c and 26d are used. The curved sides of lenses 26a and 26b face each other, as do the curved sides of lenses 26c and 26d. Since the Ramsden eyepiece has a focal plane preceding the field lens, here lens 26b, a scale 28 is mounted in the housing 18 on this plane. In this manner, the scale 28 appears superimposed upon the electrometer 16. The lenses 26 and the scale 28 are cemented into the housing 18, and stoppers 27 placed between the lenses and the scale accurately maintain proper distances. A ridge 70 on the end of the housing 18 adjacent to the ocular lens 26a prevents the lenses 26 from sliding out of this end of the housing 18.

The electrometer 16 includes a supporting wire 30 which is mounted upon a transparent disc 32. The disc 32 is transversely mounted in the end portion 22 of the housing 18. The disc 32 may be of glass or other transparent materials which may be readily sealed to the housing 18 by any of the well known glass-to-metal sealing means. An aperture 34 through a portion of the disc 32 aids in the transmission of light through the dosimeter.

The electrometer 16 is provided with a fiber 38 which is mounted upon a U-shaped fiber support 36, and also assumes this shape. The fiber 38 may be a quartz fiber. The fiber support 36 is provided with a small bore 40 on the end opposite the fiber 38 into which the supporting wire 30 is wedged and secured. The entire electrometer 16 is mounted slightly off the center axis of the housing 18, and forms the inner electrode of the ionization chamber 12. The outer electrode is the inner surfaces of the housing 18 and the tube 20, together with the coating thereon to be described later.

A fin 42 is cut from the end portion 22 of the housing 18 on the surface contiguous to the fiber 38. The fin 42 is mounted on the opposite side of the fiber with respect to the fiber support 36. The fin 42 is relatively narrow, and many times its width in length. However, the fin 42 is not long enough to contact the fiber 38, even in their closest positions.

A mixture of graphite and grease is used as a coating 44 on the inner surface of the housing 18 and on the inner surface of the supporting tube 20 between the charging switch 14 and the optical system 10. It forms a surface having relatively good electrical conductivity which will catch dust and dirt particles in the ionization chamber 12, and prevent them from having an injurious effect upon the operation of the ionization chamber.

The switch charging mechanism 14 is sealed into the open end of the supporting tube 20, and consists of a switch housing 46 which is cylindrical in shape having an outside diameter approximately equal to the inside diameter of the supporting tube 20, a contact rod 48 movably disposed along the axis of the switch housing 46, and an armature 50 in the shape of a rectangular bar attached to the contract rod 48 approximately at its center. The switch housing 46 consists of a cylindrical member 52 which is snugly fitted into the supporting tube 20 of the dosimeter, a disc 54 attached to the inner end of the cylindrical member and is provided with an aperture 56 at its center having a diameter sufficient to permit motion of the contact rod 48 therethrough, a second disc 58 attached to the open end of the cylindrical member 52 having an orifice 60 at its center which is sealed to a sleeve terminal 62, and a pair of disc-shaped keys 64 mounted within the cylindrical member 52, one of the disc-shaped keys being attached to the inner surface of the disc 54 and the other key being attached to the inner surface of disc 58. The sleeve terminal 62 is provided with a central bore 63 into which the one end of the contact rod 48 is slidably mounted. All of the parts of the switch housing 46 are constructed of transparent materials, for example methyl methacrylate resin, in order to permit the passage of light into the interior of the dosimeter so that the position of the fiber 38 of the electrometer 16 may be viewed through the optical system 10. Slots 66 in the ring-like keys 64 face the armature 50 and are slightly wider than the depth of the armature 50, so that the armature may be inserted therein. The slots 66 are oriented normal to each other also, the ring-like keys 64 are spaced from each other along the central axis by a distance which is slightly greater than the height of the armature, so that the armature may be rotated between the ring-like keys 64. A spring 67 is spiraled about the contact rod 48 and compressed between the armature 50 and the disc 54 adjacent to the ion chamber 12, thus forcing the armature 50 against the ring-like key 64 farthest from the ionization chamber 12. The remote end of the electrometer supporting wire 30 from the electrometer 16 is bent into a position on the axis of the tube 20, and forms a contact element 68 for the charging switch 14. The contact element 68 is directly in line with the contact rod 48, and motion of the contact rod 48 against the spring 67 would bring the contact rod 48 into contact with the contact element 68 were it not for the stop provided by the intermediate ring-like key 64. However, the slot 66 in the ring-like key 64 intermediate the armature 50 and the contact element 68 is of sufficient depth to permit motion of the contact rod 48 into contact with the contact element 68 when the armature 50 registers with the key 64. The armature 50 may be constructed of any ferromagnetic substance, such as iron for example.

A cap 24 constructed of transparent material, such as transparent plastic, is slidably attached to the end of the supporting tube 20, and covers the sleeve terminal 62.

The dosimeter may be very readily assembled. The ocular lens 26a is slid into the cylindrical housing 18 from the electrometer end of the housing 18, it being noted that the ridge 70 is provided to retain the lens 26a within the housing 18. A stopper 27 of suitable length, as determined by the focal lengths of lenses 26a and 26b, is then slid into the housing 18 into contact with the lens 26a. Lens 26b may then be slid into place, followed by a second stopper 27. The scale 28 may then be slid into position against the stopper 27 and secured to the housing 18 by cement. It is also preferable that the lenses 26 be cemented into place. A long stopper is then slid into the housing 18, then the lens 26c, the stopper 27, and the lens 26d. A final thin stopper 27 is then slid into the housing 18 and cemented securely to the housing in order to make certain that the optical system 10 will be rigidly secured in place. The electrometer 16 is previously assembled on the transparent disc 32, and the transparent disc 32 may now be cemented into the end portion 22 of the housing 18, thus mounting the electrometer in place.

The next step is to calibrate the electrometer 16. Figure 4 shows the device for accomplishing this calibration. A charging ring 72 is placed around the end portion 22 of the housing 18. It is provided with a threaded wing screw 74 which is threaded into the charging ring 72, the screw 74 being positioned immediately adjacent to the fin 42 in the end portion 22 of the housing 18 by positioning the ring 72 at the proper position. The electrometer 16 is connected to a source of charge, such as a battery 76, through a switch 78 and a potentiometer 80, which is connected across the battery 76. A voltmeter 82 is connected between the adjustable tap 81 of the potentiometer 80 and one of the terminals of the battery 76. That terminal is then connected to the end portion 22 of the housing 18. The switch 78 is then closed, causing the fiber 38 to be deflected outwardly into the dotted position of Figure 4. The potential applied to the electrometer is then adjusted to a predetermined calibration value by adjusting the tap 81 of the potentiometer 80 until the voltmeter 82 reads the desired value which is usually the voltage resulting in full scale deflection which will be the zero indication reading. The fiber 38 may then be deflected further until the proper scale reading is obtained by bending the fin 42 toward the fiber 38 by screwing the wing screw 74 into the charging ring 72. In this manner, fibers having slightly different physical characteristics may be placed in electrometers constructed by mass production methods.

The charging switch 14 may then be inserted into the supporting tube 20, and the graphite and grease coating 44 applied to the inner surface of the supporting tube 20 and to the inner surface of the end portion 22 of the housing 18. The end portion 22 of the housing 18 may then be inserted into the supporting tube 20. Since the supporting tube 20 is constructed of plastic and will be somewhat stretched, the housing 18 may be wedged into the tube 20. A cement may be used to assure a tight fit between the housing 18 and the tube 20, if necessary. When the housing 18 has been thoroughly inserted into the tube 20, the contact element 68 is sufficiently close to the contact rod 48 that contact may be made between these elements when the rod 48 is moved against the spring 67 and the armature 50 is in register with the slot 66 of the key 64 in the path of the armature 50. It remains then only to place the cap 24 onto the end of the supporting tube 20 to complete the dosimeter.

The cap 24 is removed from the dosimeter when the dosimeter is to be charged. A charging socket such as that shown in Figure 5 may be used to charge the dosimeter. The electrical circuit is essentially the same circuit as appears in Figure 4, and the same numbers have been assigned to the elements of the circuit in Figure 5 that have been assigned to their counterparts in Figure 4. The charging socket, which is adapted to receive the switch-end of the dosimeter, has a tubular element 90 with an inner diameter slightly greater than the outer diameter of the supporting tube 20 of the dosimeter. The one end of the tubular element 90 is open, and the other end is closed. An electrical contact 92 is mounted on the axis of the closed end of the tubular element 90, and extends through the end of the tubular element 90. A contact ring 94 is mounted in a recess 95 on the inner surface of the open end of the tubular element 90. The tubular element 90 is provided with a pair of orifices 96 which extend through the walls of the tubular member 90 on a common axis which also intersects the central axis of the tubular element 90 at a point from the closed end of the element 90 approximately equal to the distance from the end of the sleeve terminal 62 to the stationary contact element 68 in the dosimeter. Poles 98 extend into the orifices 96 to the inner surface of the tubular element 90 and are attached to a magnetic yoke 100. A magnetic coil 102 surrounds the center portion of the magnetic yoke 100 and is connected to a battery 104 through a switch 106.

The dosimeter, with the cap 24 removed, is inserted into the open end of the tubular element 90, and in this manner the end of the sleeve terminal 62 of the dosimeter is placed in contact with the electrical contact 92 at the closed end of the tubular element 90 in the charging socket. The conducting housing 18 is also in contact with the contact ring 94 at the mouth of the tubular element 90. Tap 81 of the potentiometer 80 is adjusted until the voltmeter 82 indicates that the desired charging voltage will be applied to the terminals of the dosimeter. Usually, this voltage is the potential which will give a full scale deflection of the electrometer 16. Switch 78 is then closed applying the charging potential to the terminals of the dosimeter. In order to charge the dosimeter, however, it is necessary that the charging switch 14 within the dosimeter be also closed. Hence, switch 106 is closed energizing the coil 102 and establishing a magnetic field through the charging switch 14 of the dosimeter, since it has been placed between the magnetic poles 98. The dosimeter is then rotated within the tubular element 90, usually by hand, but a mechanical device could readily be devised for this purpose. Since the magnetic armature 50 will align itself with the strongest portion of the magnetic field, the armature 50 will be drawn toward the contact element 68, and when the armature 50 is rotated to register with the slot 66 in the key 64 contiguous to the ionization chamber 12, which will occur twice for each revolution of the dosimeter within the tubular element 90, the contact rod 48 will be forced into contact with the contact element 68. In this manner, the charging voltage measured by the voltmeter 82 will be applied to the ionization chamber 12 of the dosimeter, and the capacity of the chamber 12 will be charged to the potential indicated by the voltmeter 82.

The dosimeter is then removed from the tubular element 90 with a rotational motion, so that the armature 50 will be rotated out of register with the slot 66 in the key 64 contiguous to the ionization chamber 12, and will be rotated to register with the slot 66 of the key 64 remote from the ionization chamber 12. Since the spring 67 will maintain a pressure upon the armature in the latter slot 66, there is little likelihood of the armature 50 rotating 90 degrees to register with the other slot and to permit the contact rod 48 to contact the contact element 68.

In a particular embodiment of this invention, the maximum voltage to which the ionization chamber was charged was 180 volts, and the operating voltage range for the ionization chamber extended down to approximately 120 volts. Maximum bending of the fin 42 toward the electrometer 16 had about the same effect as increasing the voltage to which the ionization chamber was charged by approximately 15 volts.

From the foregoing description, it is clear that a dosimeter may be constructed using the teachings of this invention which will be adapted to production on a mass scale. Many other embodiments and variations in the present invention may be made by the man skilled in the art, all within the intended scope and spirit of the invention.

What is claimed is:

1. A device for measuring particles and radiations comprising, in combination, a gas-tight housing, an ionization chamber mounted within the housing, and a switch mounted within the housing including a pair of contacts, one of said contacts being connected to one of the electrodes of the ionization chamber and the other contact being connected to the exterior of the housing, one of said switch contacts being stationary and the other contact being a rod slidably mounted upon an axis intersecting the stationary contact, an armature affixed to the contact rod, and a pair of slotted members mounted with slots at right angles to each other and normal to the axis of the contact rod, the slots in said members being of sufficient size to accommodate the armature, and the members being affixed to the housing on opposite sides of the armature and spaced from each other by a distance greater than the height of the armature measured along the axis of the contact rod, the distance between the bottom of the slot in the slotted member mounted between the armature and the stationary contact being less than the length of the portion of the contact rod between the armature and the end thereof confronting the stationary contact, and the distance between the top of said slot and said stationary contact being greater than the length of said portion of the contact rod.

2. A device for measuring particles and radiations comprising the elements of claim 1 in combination with a tube, a pair of sheet-like elements mounting the switch to the housing, the tube affixed to the housing, and the sheet-like elements being disposed transversely across the open ends of the tube, the slotted members, armature and contact rod being disposed within the tube between the elements, each of said elements being provided with an orifice on the axis of the contact rod, the orifice in one of said elements confronting the stationary contact, a portion of the contact rod being slidably disposed in said orifice, and a tubular terminal of electrical conducting material sealed into the orifice in the other of said elements, said tubular terminal having an inner diameter slightly greater than the diameter of the contact rod and being sealed on the end remote from the armature, one end of the contact rod being slidably disposed within said tubular terminal to make electrical contact therewith.

3. A device for measuring particles and radiations comprising the elements of claim 2 in combination with means to charge the ionization chamber including a charging socket adapted to receive the end of the housing adjacent to the switch and to permit rotation of the housing therein, electrical contact means to contact the sealed end of the tubular terminal of the switch which is adapted to be connected to one of the electrodes of the ionization chamber and to contact the other electrode of the ionization chamber, a source of charge connected to said electrical contact means, and means mounted adjacent to the charging socket to establish a magnetic field through the interior of the socket, whereby the magnetic field may be used to orient the armature into register with the slot of the slotted member between the armature and the stationary contact of the switch and to move the contact rod into contact with the stationary contact.

4. A device for measuring particles and radiations comprising the elements of claim 1 in combination with means exterior to the housing to establish a magnetic field to orientate the armature and to move the contact rod into contact with the contact element.

5. A device for measuring particles and radiations comprising, in combination, and ionization chamber having a plurality of electrodes and an ionizing medium therebetween, and a coating including a mixture of graphite and grease on the inner surface of the ionization chamber.

6. A device for measuring particles and radiations comprising, in combination, a plurality of electrodes, an ionizing medium therebetween, means to seal the ionizing medium from the ambient atmosphere, and a coating of graphite and grease on at least a portion of the surfaces of the combination adjacent to the ionizing medium.

7. A device for measuring particles and radiation comprising, in combination, a gas-tight housing, an ionization chamber mounted within the housing and a switch mounted within the housing including a pair of switch contacts, one of said contacts being affixed to the housing and connected to one of the electrodes of the ionization chamber, and the other contact being slidable within the housing and connected to the exterior of the housing, said housing being provided with at least two spaced slots parallel to the path of the slidable contact and angularly displaced from each other relative to the path of the slidable contact and a recess between said slots, said slidable contact being provided with a protruding portion adapted to slide within the slots and rotate in the recess between the slots and the housing.

FRANCIS R. SHONKA.

REFERENCES CITED

The following references are of record in the file of this patent:

UNITED STATES PATENTS

| Number | Name | Date |
|---|---|---|
| 1,605,911 | Banneitz | Nov. 9, 1926 |
| 1,933,063 | Kolhorster | Oct. 31, 1933 |
| 2,151,979 | Lems | Mar. 28, 1939 |
| 2,168,464 | Yeda | Aug. 8, 1939 |
| 2,376,196 | Scherbatskoy | May 15, 1945 |